US009185626B1

(12) United States Patent
Kunkel et al.

(10) Patent No.: US 9,185,626 B1
(45) Date of Patent: Nov. 10, 2015

(54) SECURE PEER-TO-PEER CALL FORKING FACILITATED BY TRUSTED 3RD PARTY VOICE SERVER PROVISIONING

(71) Applicant: Sprint Communications Company L.P., Overland Park, KS (US)

(72) Inventors: Philip M. Kunkel, Overland Park, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 8 days.

(21) Appl. No.: 14/066,661

(22) Filed: Oct. 29, 2013

(51) Int. Cl.
*H04W 40/02* (2009.01)
*H04L 29/06* (2006.01)

(52) U.S. Cl.
CPC ........... *H04W 40/02* (2013.01); *H04L 65/1069* (2013.01)

(58) Field of Classification Search
None
See application file for complete search history.

(56) References Cited

U.S. PATENT DOCUMENTS

| | | | |
|---|---|---|---|
| 5,303,378 | A | 4/1994 | Cohen |
| 5,321,735 | A | 6/1994 | Breeden et al. |
| 5,764,889 | A | 6/1998 | Ault et al. |
| 5,796,952 | A | 8/1998 | Davis et al. |
| 6,131,024 | A | 10/2000 | Boltz |
| 6,177,860 | B1 | 1/2001 | Cromer et al. |
| 6,219,712 | B1 | 4/2001 | Mann et al. |
| 6,363,150 | B1 | 3/2002 | Bhagavath et al. |
| 6,477,180 | B1 | 11/2002 | Aggarwal et al. |
| 6,507,904 | B1 | 1/2003 | Ellison et al. |
| 6,614,893 | B1 | 9/2003 | Paiz |
| 6,668,322 | B1 | 12/2003 | Wood et al. |
| 6,691,230 | B1 | 2/2004 | Bardon |
| 6,754,784 | B1 | 6/2004 | North et al. |
| 6,823,454 | B1 | 11/2004 | Hind et al. |
| 6,824,064 | B2 | 11/2004 | Guthery et al. |
| 6,895,234 | B1 | 5/2005 | Laursen et al. |
| 7,043,241 | B1 | 5/2006 | Sladek et al. |
| 7,366,806 | B2 | 4/2008 | Milenkovic et al. |
| 7,387,240 | B2 | 6/2008 | Ziegler |

(Continued)

FOREIGN PATENT DOCUMENTS

| | | |
|---|---|---|
| WO | WO2011025433 A1 | 3/2011 |
| WO | WO2012064171 A1 | 5/2012 |

(Continued)

OTHER PUBLICATIONS

FAIPP Pre-Interview Communication dated Mar. 20, 2014, U.S. Appl. No. 13/482,731, filed May 29, 2012.

(Continued)

*Primary Examiner* — Miya J Cato
*Assistant Examiner* — Temitayo Folayan

(57) ABSTRACT

A method of extending a peer-to-peer platform to a mobile communication device comprises assigning an identifier to a Voice over Internet Protocol identity and sending a license key to a trusted register in the mobile communication device. The method further comprises cross listing the identifier with the Voice over Internet Protocol identity, wherein a call placed to the Voice over Internet Protocol identity is routed to both an electronic device and the mobile communication device and routing a Voice Over Internet Protocol call addressed to the Voice over Internet Protocol identity to both the electronic device and the mobile communication device, wherein the call routing to the mobile communication device is based on the identifier and the cross listing.

19 Claims, 10 Drawing Sheets

(56) References Cited

U.S. PATENT DOCUMENTS

| | | | |
|---|---|---|---|
| 7,519,824 B1 | 4/2009 | Peyravian et al. | |
| 7,552,467 B2 | 6/2009 | Lindsay | |
| 7,571,364 B2 | 8/2009 | Whetsel | |
| 7,650,645 B1 | 1/2010 | Langendorf et al. | |
| 7,716,720 B1 | 5/2010 | Marek et al. | |
| 7,873,837 B1 | 1/2011 | Lee et al. | |
| 7,895,642 B1 | 2/2011 | Larson et al. | |
| 7,921,303 B2 | 4/2011 | Mauro, II | |
| 8,060,449 B1 | 11/2011 | Zhu | |
| 8,073,428 B2 | 12/2011 | Khetawat et al. | |
| 8,086,238 B1 * | 12/2011 | Kosar | 455/445 |
| 8,112,794 B2 | 2/2012 | Little et al. | |
| 8,190,919 B2 | 5/2012 | Natarajan et al. | |
| 8,204,480 B1 | 6/2012 | Lindteigen et al. | |
| 8,238,823 B2 | 8/2012 | Maugars et al. | |
| 8,271,336 B2 | 9/2012 | Mikurak | |
| 8,316,237 B1 | 11/2012 | Felsher et al. | |
| 8,402,543 B1 | 3/2013 | Ranjan et al. | |
| 8,413,229 B2 | 4/2013 | Mullick et al. | |
| 8,429,409 B1 | 4/2013 | Wall et al. | |
| 8,443,420 B2 | 5/2013 | Brown et al. | |
| 8,447,983 B1 | 5/2013 | Beck et al. | |
| 8,494,576 B1 | 7/2013 | Bye et al. | |
| 8,504,097 B1 | 8/2013 | Cope et al. | |
| 8,588,749 B1 | 11/2013 | Sadhvani et al. | |
| 8,631,247 B2 | 1/2014 | O'Loughlin et al. | |
| 8,632,000 B2 | 1/2014 | Laracey | |
| 8,649,770 B1 | 2/2014 | Cope et al. | |
| 8,667,607 B2 | 3/2014 | Paczkowski et al. | |
| 8,707,056 B2 | 4/2014 | Felton | |
| 8,712,407 B1 | 4/2014 | Cope et al. | |
| 8,718,554 B2 | 5/2014 | Abel | |
| 8,719,586 B1 | 5/2014 | Paleja et al. | |
| 8,726,343 B1 | 5/2014 | Borzycki et al. | |
| 8,738,333 B1 | 5/2014 | Behera et al. | |
| 8,750,839 B1 | 6/2014 | Paczkowski et al. | |
| 8,752,140 B1 | 6/2014 | Paczkowski et al. | |
| 8,762,298 B1 | 6/2014 | Ranjan et al. | |
| 8,787,873 B1 | 7/2014 | Hitt et al. | |
| 8,793,808 B2 | 7/2014 | Boccon-Gibod | |
| 8,797,875 B2 | 8/2014 | Garcia et al. | |
| 8,811,971 B2 | 8/2014 | Corda et al. | |
| 8,831,998 B1 | 9/2014 | Cramer et al. | |
| 8,839,460 B2 | 9/2014 | Shirlen et al. | |
| 8,850,568 B2 | 9/2014 | Shirlen et al. | |
| 8,856,600 B2 | 10/2014 | Zadigian et al. | |
| 8,862,181 B1 | 10/2014 | Cope et al. | |
| 8,863,252 B1 | 10/2014 | Katzer et al. | |
| 8,881,977 B1 | 11/2014 | Paczkowski et al. | |
| 8,886,925 B2 | 11/2014 | Qureshi et al. | |
| 8,954,588 B1 | 2/2015 | Bertz et al. | |
| 8,984,592 B1 | 3/2015 | Paczkowski et al. | |
| 8,989,705 B1 | 3/2015 | Katzer et al. | |
| 9,015,068 B1 | 4/2015 | Bertz et al. | |
| 9,021,585 B1 | 4/2015 | Paczkowski et al. | |
| 9,027,102 B2 | 5/2015 | Katzer et al. | |
| 9,049,013 B2 | 6/2015 | Paczkowski et al. | |
| 9,049,186 B1 | 6/2015 | Paczkowski et al. | |
| 9,066,230 B1 | 6/2015 | Paczkowski et al. | |
| 9,069,952 B1 | 6/2015 | Paczkowski et al. | |
| 9,104,840 B1 | 8/2015 | Paczkowski et al. | |
| 9,118,655 B1 | 8/2015 | Paczkowski et al. | |
| 2001/0041591 A1 | 11/2001 | Carroll | |
| 2002/0035697 A1 | 3/2002 | McCurdy et al. | |
| 2002/0091569 A1 | 7/2002 | Kitaura et al. | |
| 2002/0095389 A1 | 7/2002 | Gaines | |
| 2002/0156911 A1 | 10/2002 | Croman et al. | |
| 2002/0166070 A1 | 11/2002 | Mualem et al. | |
| 2002/0174344 A1 | 11/2002 | Ting | |
| 2002/0181503 A1 | 12/2002 | Montgomery, Jr. | |
| 2002/0184325 A1 | 12/2002 | Killcommons et al. | |
| 2002/0194361 A1 | 12/2002 | Itoh et al. | |
| 2002/0194496 A1 | 12/2002 | Griffin et al. | |
| 2003/0045273 A1 | 3/2003 | Pyhalammi et al. | |
| 2003/0093667 A1 | 5/2003 | Dutta et al. | |
| 2003/0110046 A1 | 6/2003 | Cofta | |
| 2003/0126225 A1 | 7/2003 | Camble et al. | |
| 2003/0172163 A1 | 9/2003 | Fujita et al. | |
| 2003/0216143 A1 | 11/2003 | Roese et al. | |
| 2003/0229514 A2 | 12/2003 | Brown | |
| 2003/0237002 A1 | 12/2003 | Oishi et al. | |
| 2004/0158840 A1 | 8/2004 | Rothman et al. | |
| 2004/0202328 A1 | 10/2004 | Hara | |
| 2004/0233844 A1 | 11/2004 | Yu et al. | |
| 2004/0234049 A1 | 11/2004 | Melideo | |
| 2004/0243810 A1 | 12/2004 | Rindborg et al. | |
| 2005/0015601 A1 | 1/2005 | Tabi | |
| 2005/0045719 A1 | 3/2005 | Yang | |
| 2005/0052994 A1 | 3/2005 | Lee | |
| 2005/0091505 A1 | 4/2005 | Riley et al. | |
| 2005/0123596 A1 | 6/2005 | Kohane et al. | |
| 2005/0125396 A1 | 6/2005 | Liu | |
| 2005/0138433 A1 | 6/2005 | Linetsky | |
| 2005/0181796 A1 | 8/2005 | Kumar et al. | |
| 2005/0228892 A1 | 10/2005 | Riley et al. | |
| 2005/0235166 A1 | 10/2005 | England et al. | |
| 2005/0239481 A1 | 10/2005 | Seligmann | |
| 2005/0272445 A1 | 12/2005 | Zellner | |
| 2005/0289355 A1 | 12/2005 | Kitariev et al. | |
| 2006/0030291 A1 | 2/2006 | Dawson et al. | |
| 2006/0036851 A1 | 2/2006 | DeTreville | |
| 2006/0040641 A1 | 2/2006 | Dawson et al. | |
| 2006/0129488 A1 | 6/2006 | Vincent | |
| 2006/0156026 A1 | 7/2006 | Utin | |
| 2006/0164978 A1 | 7/2006 | Werner et al. | |
| 2006/0171537 A1 | 8/2006 | Enright | |
| 2006/0190605 A1 | 8/2006 | Franz et al. | |
| 2006/0212853 A1 | 9/2006 | Sutardja | |
| 2006/0224901 A1 | 10/2006 | Lowe | |
| 2006/0245438 A1 | 11/2006 | Sajassi et al. | |
| 2006/0258289 A1 | 11/2006 | Dua | |
| 2006/0259790 A1 | 11/2006 | Asokan et al. | |
| 2006/0261949 A1 | 11/2006 | Kim et al. | |
| 2006/0277307 A1 | 12/2006 | Bernardin et al. | |
| 2006/0277433 A1 | 12/2006 | Largman et al. | |
| 2007/0011061 A1 | 1/2007 | East | |
| 2007/0038648 A1 | 2/2007 | Chetwood et al. | |
| 2007/0061535 A1 | 3/2007 | Xu et al. | |
| 2007/0078988 A1 | 4/2007 | Miloushev et al. | |
| 2007/0079120 A1 | 4/2007 | Bade et al. | |
| 2007/0094273 A1 | 4/2007 | Fritsch et al. | |
| 2007/0094691 A1 | 4/2007 | Gazdzinski | |
| 2007/0118880 A1 | 5/2007 | Mauro, II | |
| 2007/0143210 A1 | 6/2007 | Yeung et al. | |
| 2007/0162759 A1 | 7/2007 | Buskey et al. | |
| 2007/0167167 A1 * | 7/2007 | Jiang | 455/453 |
| 2007/0177771 A1 | 8/2007 | Tanaka et al. | |
| 2007/0180120 A1 | 8/2007 | Bainbridge et al. | |
| 2007/0186212 A1 | 8/2007 | Mazzaferri et al. | |
| 2007/0197261 A1 | 8/2007 | Humbel | |
| 2007/0214332 A1 | 9/2007 | Sonoda et al. | |
| 2007/0276969 A1 | 11/2007 | Bressy et al. | |
| 2007/0277223 A1 | 11/2007 | Datta et al. | |
| 2008/0005794 A1 | 1/2008 | Inoue et al. | |
| 2008/0014867 A1 | 1/2008 | Finn | |
| 2008/0020745 A1 | 1/2008 | Bae et al. | |
| 2008/0022374 A1 | 1/2008 | Brown et al. | |
| 2008/0051142 A1 | 2/2008 | Calvet et al. | |
| 2008/0092213 A1 | 4/2008 | Wei et al. | |
| 2008/0097793 A1 | 4/2008 | Dicks et al. | |
| 2008/0108321 A1 | 5/2008 | Taaghol et al. | |
| 2008/0109662 A1 | 5/2008 | Natarajan et al. | |
| 2008/0121687 A1 | 5/2008 | Buhot | |
| 2008/0146280 A1 | 6/2008 | Sasse et al. | |
| 2008/0155271 A1 | 6/2008 | Barck et al. | |
| 2008/0159129 A1 | 7/2008 | Songhurst et al. | |
| 2008/0159131 A1 | 7/2008 | Hoeflin et al. | |
| 2008/0162361 A1 | 7/2008 | Sklovsky | |
| 2008/0176538 A1 | 7/2008 | Terrill et al. | |
| 2008/0188178 A1 | 8/2008 | Maugars et al. | |
| 2008/0201212 A1 | 8/2008 | Hammad et al. | |
| 2008/0201578 A1 | 8/2008 | Drake | |
| 2008/0208681 A1 | 8/2008 | Hammad et al. | |
| 2008/0212503 A1 | 9/2008 | Lipford et al. | |

(56) References Cited

U.S. PATENT DOCUMENTS

| | | |
|---|---|---|
| 2008/0232259 A1 | 9/2008 | Thomson |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0227290 A1 | 9/2009 | Chien |
| 2009/0248445 A1 | 10/2009 | Harnick |
| 2009/0271321 A1 | 10/2009 | Stafford |
| 2009/0281947 A1 | 11/2009 | Erel |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1* | 10/2012 | Brudnicki et al. .................. 726/6 |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |

(56) References Cited

U.S. PATENT DOCUMENTS

| | | |
|---|---|---|
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Burdnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0262264 A1 | 10/2013 | Karstoft |
| 2013/0263212 A1 | 10/2013 | Faltyn et al. |
| 2013/0290709 A1 | 10/2013 | Muppidi et al. |
| 2013/0305333 A1 | 11/2013 | Katzer et al. |
| 2013/0310003 A1 | 11/2013 | Sadhvani et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0047548 A1 | 2/2014 | Bye et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0155025 A1 | 6/2014 | Parker et al. |
| 2014/0173747 A1 | 6/2014 | Govindaraju |
| 2014/0188738 A1 | 7/2014 | Huxham |
| 2014/0215196 A1 | 7/2014 | Berlin |
| 2014/0245444 A1 | 8/2014 | Lutas et al. |
| 2014/0254381 A1 | 9/2014 | Racz Sandor et al. |
| 2014/0267332 A1 | 9/2014 | Chhabra et al. |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |
| 2015/0106805 A1 | 4/2015 | Melander et al. |
| 2015/0169885 A1 | 6/2015 | Paczkowski et al. |
| 2015/0172928 A1 | 6/2015 | Katzer et al. |

FOREIGN PATENT DOCUMENTS

| | | |
|---|---|---|
| WO | 2013170228 A2 | 11/2013 |
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
FAIPP Pre-Interview Communication dated Aug. 4, 2014, U.S. Appl. No. 13/844,357, filed Mar. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.

(56) References Cited

OTHER PUBLICATIONS

Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Search Report and Written Opinion, dated Apr. 22, 2014, PCT/US13/53617, filed on Aug. 5, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber=1617569.

Foreign Communication from a Related Counterpart—International Search Report and Written Opinion, dated Jul. 11, 2014, PCT/US14/16651, filed on Feb. 16, 2014.
Cope, Warren B., et al., "Electronic Purchase Transaction Trust Infrastructure", filed May 29, 2012, U.S. Appl. No. 13/482,731.
Katzer, Robin D., et al., "Secure Placement of Centralized Media Controller Application in Mobile Access Terminal", filed Nov. 11, 2011, U.S. Appl. No. 13/294,177.
Paczkowski, Lyle W., et al., "Trusted Policy and Charging Enforcement Function", filed Jun. 27, 2012, U.S. Appl. No. 13/533,969.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Nov. 26, 2013, U.S. Appl. No. 14/090,667.
Katzer, Robin D., et al., "Trusted Access to Third Party Applications Systems and Methods", filed Jul. 25, 2012, U.S. Appl. No. 13/557,213.
Paczkowski, Lyle W., et al., "Trusted Security Zone Access to Peripheral Devices", filed Jan. 6, 2014, U.S. Appl. No. 14/148,714.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, Application No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Trusted Processing Location Within a Graphics Processing Unit", filed Jul. 10, 2013, U.S. Appl. No. 13/939,175.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Paczkowski, Lyle W., et al., "Trusted Security Zone Containers for the Protection and Confidentiality of Trusted Service Manager Data", filed Feb. 16, 2014, PCT Application No. PCT/US14/16651.
Paczkowski, Lyle W., et al., "Verifying Applications Using a Trusted Security Zone", filed Aug. 12, 2013, U.S. Appl. No. 13/964,112.

(56) References Cited

OTHER PUBLICATIONS

Bye, Stephen James, et al., "Delivering Digital Content to a Mobile Device via a Digital Rights Clearing House", filed Apr. 10, 2013, U.S. Appl. No. 13/860,338.

McCracken, Billy Gene, Jr., et al. "Mobile Communication Device Profound Identity Brokering Framework", filed Jun. 6, 2013, U.S. Appl. No. 13/912,190.

Urbanek, Robert E., Subscriber Identity Module Virtualization:, filed Nov. 20, 2013, U.S. Appl. No. 14/085,474.

Krieger, Michael D., et al., "Billing Varied Service Based on Tier", filed on Nov. 8, 2013, U.S. Appl. No. 14/075,663.

Paczkowski, Lyle W., et al., "Trusted Display and Transmission of Digital Ticket Documentation", filed Jan. 24, 2014, U.S. Appl. No. 14/163,047.

Loman, Clint H., et al., "Verification of Mobile Device Integrity During Activation", filed Mar. 28, 2014, U.S. Appl. No. 14/229,532.

Paczkowski, Lyle W., et al., "Network Based Temporary Trust Extension to a Remote or Mobile Device Enabled via Specialized Cloud Services", filed Jul. 29, 2014, U.S. Appl. No. 14/446,330.

Cordes, Kevin R., et al., "Digest of Biographical Information for an Electronic Device with Static and Dynamic Portions", filed on Apr. 4, 2013, U.S. Appl. No. 13/857,141.

Cordes, Kevin R., et al., "Radio Frequency Identity (RFID) Chip Electrically and Communicatively Coupled to Motherboard of Mobile Communication Device", filed on Apr. 4, 2013, U.S. Appl. No. 13/857,139.

Cordes, Kevin R., et al., "System for Managing a Digest of Biographical Information Stored in a Radio Frequency Identity Chip Coupled to a Mobile Communication Device", filed on Apr. 4, 2013, U.S. Appl. No. 13/857,138.

Notice of Allowance dated Dec. 22, 2014, U.S. Appl. No. 13/470,203, filed May 11, 2012.

Notice of Allowance dated Feb. 5, 2015, U.S. Appl. No. 13/533,969, filed Jun. 27, 2012.

Office Action dated Dec. 15, 2014, U.S. Appl. No. 13/571,348, filed Aug. 10, 2012.

Restriction Requirement dated Jan. 2, 2015, U.S. Appl. No. 13/762,319, filed Feb. 7, 2013.

Notice of Allowance dated Dec. 3, 2014, U.S. Appl. No. 13/594,777, filed Aug. 25, 2012.

First Action Interview Office Action dated Dec. 3, 2014, U.S. Appl. No. 13/594,779, filed Aug. 25, 2012.

Notice of Allowance dated Feb. 26, 2015, U.S. Appl. No. 13/786,450, filed Mar. 5, 2013.

FAIPP Pre-Interview Communication dated Dec. 16, 2014, U.S. Appl. No. 13/898,435, filed May 20, 2013.

Notice of Allowance dated Feb. 20, 2015, U.S. Appl. No. 13/898,435, filed May 20, 2013.

Notice of Allowance dated Dec. 19, 2014, U.S. Appl. No. 13/844,325, filed Mar. 15, 2013.

Notice of Allowance dated Jan. 2, 2015, U.S. Appl. No. 13/831,463, filed Mar. 14, 2013.

FAIPP Pre-Interview Communication dated Feb. 4, 2015, U.S. Appl. No. 14/075,663, filed Nov. 8, 2013.

FAIPP Pre-Interview Communication dated Feb. 25, 2015, U.S. Appl. No. 14/163,047, filed Jan. 24, 2014.

Restriction Requirement dated Jan. 5, 2015, U.S. Appl. No. 13/857,139, filed Apr. 4, 2013.

Foreign Communication from a Related Counterpart—International Preliminary Report on Patentability, dated Jan. 8, 2015, PCT/US13/47729, filed Jun. 25, 2013.

Foreign Communication from a Related Counterpart—International Preliminary Report on Patentability, dated Feb. 19, 2015, PCT/US13/53617, filed on Aug. 5, 2013.

Foreign Communication from a Related Counterpart—International Preliminary Report on Patentability, dated Feb. 5, 2015, PCT/US13/51750, filed on Jul. 24, 2013.

Katzer, Robin D., et al., "Web Server Bypass of Backend Process on Near Field Communications and Secure Elements Chips", filed Feb. 26, 2015, U.S. Appl. No. 14/632,850.

Neson, Tracy L., et al., "Mated Universal Serial Bus (USB) Wireless Dongles Configured with Destination Addresses", filed Jan. 26, 2015, U.S. Appl. No. 14/606,011.

Paczkowski, Lyle W., et al., "Trusted Code Generation and Verification to Prevent Fraud from Maleficent External Devices that Capture Data", filed Jan. 14, 2015, U.S. Appl. No. 14/592,218.

FAIPP Pre-Interview Communication dated Mar. 25, 2015, U.S. Appl. No. 13/532,588, filed Jun. 25, 2012.

FAIPP Pre-Interview Communication dated Mar. 10, 2015, U.S. Appl. No. 13/762,319, filed Feb. 7, 2013.

FAIPP Pre-Interview Communication dated May 21, 2015, U.S. Appl. No. 14/090,667, filed Nov. 26, 2013.

Final Office Action dated Apr. 7, 2015, U.S. Appl. No. 13/844,145, filed Mar. 15, 2013.

First Action Interview Office Action dated Apr. 7, 2015, U.S. Appl. No. 13/802,404, filed Mar. 13, 2013.

FAIPP Pre-Interview Communication dated Mar. 26, 2015, U.S. Appl. No. 13/939,175, filed Jul. 10, 2013.

Final Office Action dated Mar. 24, 2015, U.S. Appl. No. 13/844,282, filed Mar. 15, 2013.

FAIPP Pre-Interview Communication dated Mar. 24, 2015, U.S. Appl. No. 13/964,112, filed Aug. 12, 2013.

FAIPP Pre-Interview Communication dated Apr. 15, 2015, U.S. Appl. No. 14/085,474, filed Nov. 20, 2013.

First Action Interview Office Action dated Apr. 10, 2015, U.S. Appl. No. 14/075,663, filed Nov. 8, 2013.

Notice of Allowance dated Apr. 9, 2015, U.S. Appl. No. 14/163,047, filed Jan. 24, 2014.

FAIPP Pre-Interview Communication dated Mar. 2, 2015, U.S. Appl. No. 13/857,138, filed Apr. 4, 2013.

First Action Interview Office Action dated Apr. 20, 2015, U.S. Appl. No. 13/857,138, filed Apr. 4, 2013.

Bertz, Lyle T., et al., "Framework for Real-Time Brokering of Digital Content Delivery," filed Mar. 17, 2015, U.S. Appl. No. 14/659,614.

Marquard, et al., "Infrastructure for Secure Short Message Transmission," filed Apr. 7, 2015, U.S. Appl. No. 14/681,077.

Paczkowski, Lyle W., et al., "Trusted Code Generation and Verification to Prevent Fraud from Maleficent External Devices that Capture Data," filed Jan. 14, 2015, U.S. Appl. No. 14/596,218.

Notice of Allowance dated May 29, 2015, U.S. Appl. No. 14/085,474, filed Nov. 20, 2013.

FAIPP Pre-Interview Communication dated Jul. 2, 2015, U.S. Appl. No. 14/632,850, filed Feb. 26, 2015.

Notice of Allowance dated Jun. 17, 2015, U.S. Appl. No. 13/571,348, filed on Aug. 10, 2012.

Notice of Allowance dated Jun. 9, 2015, U.S. Appl. No. 13/762,319, filed on Feb. 7, 2013.

Notice of Allowance dated Aug. 4, 2015, U.S. Appl. No. 14/090,667, filed Nov. 26, 2013.

Notice of Allowance dated Jul. 6, 2015, U.S. Appl. No. 13/844,145, filed on Mar. 15, 2013.

Notice of Allowance dated Aug. 14, 2015, U.S. Appl. No. 13/594,779, filed on Aug. 25, 2012.

Final Office Action dated Aug. 27, 2015, U.S. Appl. No. 13/802,404, filed on Mar. 13, 2013.

Notice of Allowance dated Jul. 7, 2015, U.S. Appl. No. 13/939,175, filed Jul. 10, 2013.

Advisory Action dated Jun. 10, 2015, U.S. Appl. No. 13/844,282, filed on Mar. 15, 2013.

Office Action dated Aug. 24, 2015, U.S. Appl. No. 13/844,282, filed on Mar. 15, 2013.

Notice of Allowance dated Aug. 3, 2015, U.S. Appl. no. 13/964,112, filed Aug. 12, 2013.

Notice of Allowance dated Jul. 1, 2015, U.S. Appl. No. 14/075,663, filed on Nov. 8, 2013.

Notice of Allowance dated Jul. 22, 2015, U.S. Appl. No. 14/229,532, filed Mar. 28, 2014.

Notice of Allowance dated Aug., 28, 2015, Application U.S. Appl. No. 14/446,330, filed Jul. 29, 2014.

(56) References Cited

OTHER PUBLICATIONS

Faipp Pre-Interview Communication dated Aug. 5, 2015, U.S. Appl. No. 13/857,141, filed on Apr. 4, 2013.

FAIPP Pre-Interview Communication dated Jun. 2, 2015, U.S. Appl. No. 13/857,139 filed on Apr. 4, 2013.

Notice of Allowance dated Jun. 11, 2015, U.S. Appl. No. 13/857,138, filed on Apr. 4, 2013.

Henderson, Tristan, et al., "On the Wire, Congestion Pricing: Paying Your Way in Communications Networks," University College London, Sep.-Oct. 2001, retrieved from: http://tristan.host.cs.st-andrews.ac.uk!research/pubs/ieeeic01.pdf.

* cited by examiner

SECURE PEER-TO-PEER CALL FORKING FACILITATED BY TRUSTED 3RD PARTY VOICE SERVER PROVISIONING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic devices, such as personal computers, may engage in Voice over Internet Protocol (VoIP) communications. VoIP is a methodology for delivering voice communications and multimedia over Internet Protocol (IP) networks rather than over the Public Switched Telephone Network (PSTN). VoIP communications in which electronic devices engage include videoconferencing which may allow participants to view multimedia images of communicating parties. VoIP videoconferencing can occur over peer-to-peer network architectures in which the communicating electronic devices act as peer nodes in a system that lacks central infrastructure. By acting as peer nodes, the communicating electronic devices each share a client-server role in the peer-to-peer communication.

SUMMARY

In an embodiment, a method of extending a peer-to-peer platform to a mobile communication device is disclosed. The method comprises assigning an identifier to a Voice over Internet Protocol identity, sending a license key to a trusted register in the mobile communication device, and cross listing the identifier with the Voice over Internet Protocol identity, wherein a call placed to the Voice over Internet Protocol identity is routed to both an electronic device and the mobile communication device. The method further comprises routing a Voice Over Internet Protocol call addressed to the Voice over Internet Protocol identity to both the electronic device and the mobile communication device, wherein the call routing to the mobile communication device is based on the identifier and the cross listing.

In an embodiment, a method of establishing a peer-to-peer platform on a mobile communication device is disclosed. The method comprises receiving in a trusted security zone of the mobile communication device a license key and an identifier, wherein the identifier is coupled with a Voice over Internet Protocol service account, authenticating the mobile communication device to the Voice over Internet Protocol service based on at least one of the license key and the identifier, and receiving, on the mobile communication device, an incoming call via the Public Switched Telephone Network, wherein the incoming call originated in the Internet Protocol realm.

In an embodiment, a method of extending a peer-to-peer platform to a mobile communication device is disclosed. The method comprises sending a license key and an identifier from trusted data storage to a trusted security zone of a mobile communication device, wherein the identifier is hidden in the trusted security zone such that characteristics of the identifier are unknown to a user of the mobile communication device, unknown to a Public Switched Telephone Network service provider, and are unknown to a Voice over Internet Protocol service provider. The method further comprises linking the identifier to a Voice over Internet Protocol service account of an electronic device and routing a Voice over Internet Protocol call addressed to the account of the electronic device to the mobile communication device based on the identifier, wherein the call is converted from Internet Protocol to the Public Switched Telephone Network at a routing table.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
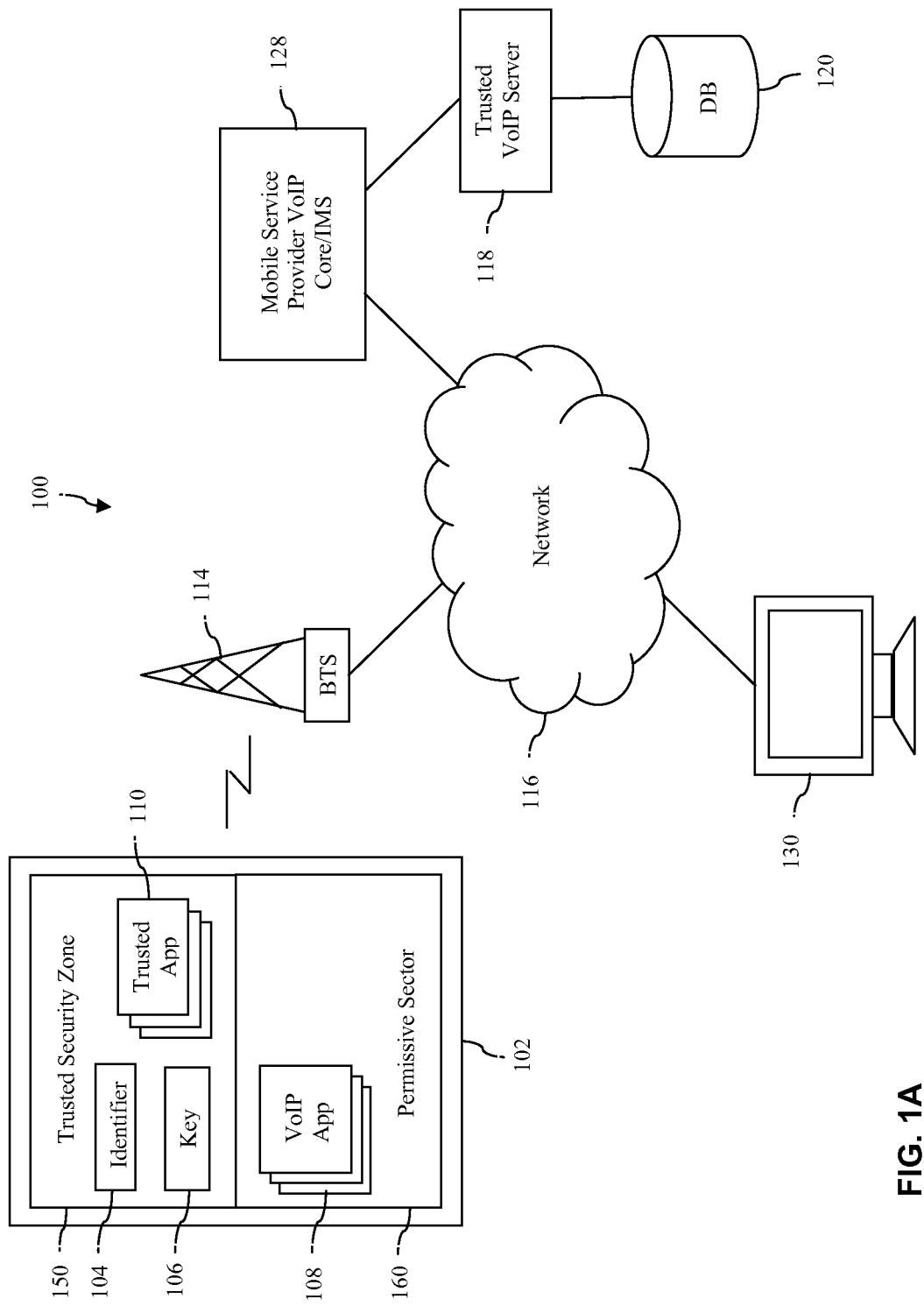
FIG. 1A is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Voice over Internet Protocol (VoIP) services such as Skype, Google Talk, OoVoo, Vonage or other services may be used for voice and/or multimedia communications between electronic devices such as desktop computers, laptop computers, etc. Users choosing to communicate using Voice over Internet Protocol services may find videoconferencing via the Voice over Internet Protocol service preferable to communicating over a landline of the Public Switched Telephone Network (PSTN) for a variety of reasons. For example, users may prefer to communicate using Voice over Internet Protocol services because they find the communication to be more personal than communication that occurs over a landline of the Public Switched Telephone Network.

Thus, in some cases, a calling party may be more likely to attempt an initial call via a Voice over Internet Protocol service than to attempt the call via the Public Switched Telephone Network. It is sometimes the case that the called party of a Voice over Internet Protocol call is unable to receive the call due to being away from the called electronic device, the called electronic device being out of service due to lack of service and/or malfunction, or due to some other reason. In such cases, the Voice over Internet Protocol call may not be completed, and the calling party may find it easier to invoke other communication methods in order to reach the called party.

The present disclosure teaches extending a peer-to-peer platform to a mobile communication device. In an embodiment, calls originating as Internet Protocol calls may be received on the mobile communication device via the Public Switched Telephone Network. The calls may be changed from the Internet Protocol realm to the Public Switched Telephone Network realm at a routing table within a network. Thus, a Voice over Internet Protocol (VoIP) call may be initiated by a calling party and may be received on the mobile communication device of a called party via the Public Switched Telephone Network. In an embodiment, a peer-to-peer Voice over Internet Protocol call may be dually routed to a called party's electronic device and to the called party's mobile communication device, which may be a cell phone, a mobile phone, a smartphone, etc. In some cases, the Voice over Internet Protocol call may be initially addressed to the called party's electronic device and may be routed to both the electronic device and the mobile communication device based on a cross listing in a routing table.

Such dual routing may allow the called party to receive Voice over Internet Protocol calls directed to his/her electronic device that he/she may have missed due to reasons presented above or due to other reasons. For example, a called party may be able to receive a Voice over Internet Protocol call to his/her electronic device on his/her mobile communication device when he/she is unable to receive the call on his/her electronic device. In some cases, the called party may wish to handle the call on a mobile communication device rather than on an electronic device, and routing a Voice over Internet Protocol call to both the called party's mobile communication device and the called party's electronic device may allow the called party to choose which device he/she would prefer to answer the call on.

Security measures to prevent spoofing of user identities may be beneficial to mobile communication device users and/or service providers. The present disclosure teaches provisioning a mobile communication device, operating in the Public Switched Telephone Network, such that the mobile communication device may receive calls originating as Voice over Internet Protocol calls that are routed to the mobile communication device and/or to an electronic device. The present disclosure teaches performing the provisioning under an umbrella of trust provided by a trusted security zone as described in greater detail hereinbelow. Performing the provisioning under an umbrella of trust may prevent spoofing of network identities such as a Voice over Internet Protocol identity and may prevent sniffers or other nefarious programs from infiltrating communications.

In an embodiment, a license key and an identifier may be inserted into a trusted register of the mobile communication device by a trusted source. The license key and identifier may be stored in the trusted register so that each call may be verified in trust during setup to prevent spoofing. In some cases, an End User License Agreement may be agreed to before the license key and/or the identifier are inserted into the trusted register of the mobile communication device. In some cases, the identifier may be assigned to the mobile communication device but may not be stored on the mobile communication device. The license key may serve to authenticate the mobile communication device to a Voice over Internet Protocol service. The identifier may identify the mobile communication device to the Voice over Internet Protocol service such that the mobile communication device may be associated with the electronic device in a server of the communication system. The Voice over Internet Protocol service may cross-list the identifier assigned to the mobile communication device such that a Voice over Internet Protocol call placed to the identifier will also be routed to the mobile communication device by the network service provider.

It is anticipated that trusted provisioning of a mobile communication device to be operable within a peer-to-peer manipulated single number service configured to cross-list an identifier assigned to the mobile communication device with an identifier assigned to an electronic device may provide several advantages to both a calling party and a called party. The called party may benefit from greater call receipt flexibility by being able to choose which device on which he/she would prefer to receive the call. The dual ringing nature of the present disclosure may further benefit the called party by providing a greater opportunity to receive the call. Further, a network service provider may obtain a call detail record that may be used for billing.

In an embodiment, the network service provider may provide service to the mobile communication device, and a partnered Voice over Internet Protocol provider may provide Voice over Internet Protocol services that may be used by the electronic device. In an embodiment, the network service provider and the Voice over Internet Protocol provider may be the same. An enterprise may subscribe to both the network service provider and to the Voice over Internet Protocol provider and may make use of services provided by both providers. In an embodiment, when a Voice over Internet Protocol call routed to the mobile communication device is received via the Public Switched Telephone Network, the network service provider may maintain a call detail record for the call. The call detail record may be used for billing.

The calling party may likewise benefit from a greater opportunity of the called party to receive the call. Additionally, the calling party may find it convenient for the call to dual ring to both the called party's electronic device and the called party's mobile communication device because, in the event that the called party doesn't answer a call to his/her electronic device, the calling party may save time by avoiding a separate, second call to the called party's mobile communication device. It is anticipated that both parties and service providers may benefit from protections afforded by performing authentication operations in the trusted security zone.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, hand-held terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1A, a communication system 100 is described. In an embodiment, the communication system 100 comprises a mobile communication device 102, a base transceiver station (BTS) 114, a network 116, an electronic device 130, a mobile service provider Voice over Internet Protocol (VoIP) core/Internet Protocol Multimedia Subsystem (IMS) 128, a trusted Voice over Internet Protocol (VoIP) server 118, and a trusted data store (DB) 120.

In an embodiment, the mobile communication device 102 comprises a trusted security zone 150 and a permissive sector 160. The trusted security zone 150 is depicted in FIG. 1A as comprising an identifier 104, a license key 106, and a plurality of trusted applications 110. In some cases, the trusted security zone 150 may comprise other elements to facilitate operation of the mobile communication device 102 in the communication system 100. In some embodiments, the identifier 104 may be assigned to the mobile communication device 102 but may not be stored on the mobile communication device 102. The permissive sector 160 is depicted in FIG. 1A as comprising one or more applications such as a Voice over Internet Protocol (VoIP) application 108. In some cases, the permissive sector 160 may comprise other elements. In an embodiment, the mobile communication device 102 may comprise hardware elements such as one or more memory chips, one or more processors, a radio frequency transceiver, and/or other elements and one or more of those elements may be divided into the trusted security zone 150 and the permissive sector 160. In an embodiment, the mobile communication device 102 may comprise a cellphone, a smart phone, a feature phone, a mobile phone, or something else. In an embodiment, the trusted security zone 150 may be replaced by a different secure storage component and/or a different secure information access process other than the trusted security zone and trusted execution environment described in detail further above.

In an embodiment, a user of the electronic device 130 may have a Voice over Internet Protocol identity known by a Voice over Internet Protocol service such as Skype, Oovoo, Google Talk, Vonage, or some other service. The Internet Protocol (IP) address of the electronic device 130 may be linked to the user's Voice over Internet Protocol identity such that Voice over Internet Protocol calls addressed to the user's Voice over Internet Protocol identity may be routed to the Internet Protocol address of the electronic device 130. In some cases, a Voice over Internet Protocol service account may be linked to an Internet Protocol address of the electronic device 130 and may be considered substantially similar to a Voice over Internet Protocol identity. In some contexts, the Voice over Internet Protocol identity and/or the Voice over Internet Protocol service account of a user of the electronic device 130 may be considered to be the Voice over Internet Protocol identity and the Voice over Internet Protocol service account of the electronic device 130.

A user of the electronic device 130 may use the Voice over Internet Protocol service capabilities of the electronic device 130 to communicate over the network 116. It is sometimes the case that Voice over Internet Protocol services operate through a peer-to-peer architecture, wherein each device adopts a client/server relationship in the communication. Communicating over the network 116 may include calling and receiving calls over the network 116. A calling party wishing to contact the user of the electronic device 130 may invoke a Voice over Internet Protocol service in an attempt to reach the user of the electronic device 130. In such circumstances, a Voice over Internet Protocol call may be placed by the calling party to the called party, in this case the user of the electronic device 130, by addressing the call to the user's Voice over Internet Protocol identity which may then be routed to the electronic device 130.

In an embodiment, a service provider agreement may be made between a Voice over Internet Protocol service provider and a mobile service provider that provides service to the mobile communication device 102. The agreement may allow the mobile communication device 102 to be provisioned such that Voice over Internet Protocol calls to the electronic device 130 may be dually routed to both the electronic device 130 and to the mobile communication device 102. In some cases, the mobile communication device 102 and the electronic device 130 may be owned and/or operated by a single user, thus, dual routing Voice over Internet Protocol calls to both the mobile communication device 102 and the electronic device 130 may allow the user to receive the call on either device. In an embodiment, the provisioning process and Voice over Internet Protocol calls received through the single number service arising from the provisioning may occur in the realm of trust. In some embodiments, the call setup may occur in the realm of trust, but the call itself may operate outside of the trusted execution environment.

In an embodiment, the trusted Voice over Internet Protocol server 118 may execute a trusted voice provisioning process in order to supply the mobile communication device 102 with the license key 106 and an identifier 104 for use with the Voice over Internet Protocol service. As described above, in some cases, the identifier 104 may be assigned to the mobile communication device 102 without being stored on the mobile communication device 102. The identifier 104 may comprise a mobile ID, a Voice over Long Term Evolution (VoLTE) identifier in the case of a Long Term Evolution (LTE) network, a telephone number, or some other identifier for use with the Voice over Internet Protocol service. The identifier 104 may be separate from the phone number attributed to the mobile communication device 102 by the mobile service provider. The identifier 104 may be configured to associate the mobile communication device 102 with the Voice over Internet Protocol identity of the electronic device 130. In order to provide security against spoofing, the identifier 104 may remain hidden in the trusted security zone 150 such that the characteristics of the identifier 104 remain unknown to users, mobile service providers, Public Switched Telephone Network providers, and Voice over Internet Protocol service providers.

In an embodiment, the trusted Voice over Internet Protocol server 118 may identify an identifier 104 to attribute to the mobile communication device 102 and may query the mobile service provider Voice over Internet Protocol Core/IMS 128 for session initiation protocol routing instructions and the address of the mobile communication device 102. The trusted Voice over Internet Protocol Server 118 may send the identifier 104 and the license key 106 to the mobile communication device 102. Alternatively, in some cases, only the license key 106 may be sent. In some cases, the license key 106 may be sent to the mobile communication device 102 and before the identifier 104 is sent to the mobile communication device 102. In an embodiment, the trusted Voice over Internet Protocol Server 118 may identify and send the identifier 104 and/or the license key 106 from the trusted data store 120.

Alternatively, the identifier 104 and the license key 106 may be identified and sent from different data stores. For example, the identifier 104 may be identified and sent from the trusted data store 120 and the license key 106 may be identified and sent from some other data store. In some cases, there may be a plurality of trusted data stores 120, and the identifier 104 and the license key 106 may be taken from different trusted data stores 120.

In order to maintain an environment of trust, the identifier 104 and/or license key 106 may be sent to the mobile communication device 102 via trusted end-to-end communication through one or more trusted nodes. Maintaining an environment of trust throughout the selection and transport of the identifier 104 and the license key 106 to the mobile communication device 102 may prevent the identifier 104 and/or the license key 106 from being discovered. The protection of the identifier 104 and/or the license key 106 may prevent nefarious programs from spoofing the identity of the mobile communication device 102 and/or the electronic device 130 and/ or otherwise corrupting the information transfer.

Within the mobile communication device 102, the identifier 104 and the license key 106 may be stored in a trusted register, such as a trusted port or trusted portion of memory, on the mobile communication device 102. Alternatively, the identifier 104 and the license key 106 may be stored in another trusted location on the mobile communication device 102. In some cases, the identifier 104 may not be sent to the mobile communication device 102, and the license key 106 may be stored in the trusted security zone 150. The trusted Voice over Internet Protocol server 118 may mark the trusted data store 120 to indicate that the identifier 104 and the license key 106 attributed to the mobile communication device 102 have been distributed. Marking the trusted data store 120 may prevent duplicate identifier's 104 from being attributed to other devices. The license key 106 and the identifier 104 attributed to the mobile communication device 102 may serve to authenticate the mobile communication device 102 to the Voice over Internet Protocol service and may allow the mobile communication device 102 to participate in a single number service that may allow Voice over Internet Protocol calls to be routed to the mobile communication device 102 and to the electronic device 130.

In an embodiment, the identifier 104 and/or the license key 106 may be revocable. The identifier 104 and/or the license key 106 may be revoked in response to non-payment of service, departure from an enterprise, violation of the terms of an End User License Agreement, of for some other reason. In the case that the identifier 104 and/or the license key 106 are revoked from the mobile communication device 102, the mobile communication device 102 may lose its single number service capabilities that allows it to be dually rung along with the electronic device 130.

In an embodiment, one of the trusted applications 110 may invoke the identifier 104 and/or the license key 106 to authenticate the mobile communication device 102 to the Voice over Internet Protocol service. In response to the authentication, the Voice over Internet Protocol service may send a provisioning request to the network 116, wherein the provisioning request may be configured to alter a routing table such that the mobile communication device 102 and the electronic device 130 may be cross listed as Voice over Internet Protocol call destinations reachable through Voice over Internet Protocol calls addressed to a single number. Cross listing the mobile communication device 102 and the electronic device 130 may allow Voice over Internet Protocol calls to the electronic device 130 to dually ring both the mobile communication device 102 and the electronic device 130. In some cases, Voice over Internet Protocol calls to a single number that is configured to ring through to both the mobile communication device 102 and the electronic device 130 may be considered Voice over Internet Protocol calls addressed to the electronic device 130.

In an embodiment, dually ringing the mobile communication device 102 and the electronic device 130 may comprise ringing both the devices in response to a single connection request. This may include ringing both devices at the same time, within about one half second of each other, within about one second of each other, within about two seconds of each other, within about three seconds of each other, within about four seconds of each other, within about five seconds of each other, or within some other time period of each other. Similarly, in some contexts, incoming call signals on both the mobile communication device 102 and the electronic device 130 received at the same time or within about one half second of each other, within about one second of each other, within about two seconds of each other, within about three seconds of each other, within about four seconds of each other, within about five seconds of each other, or within some other time period of each other may be considered to be dually received.

In an embodiment, the routing table may be altered to facilitate dual ringing between the mobile communication device 102 and the electronic device 130 by setting and/or modifying a Wireless Intelligent Network (WIN) trigger in a circuit switching network, by modifying a Home Subscriber Service (HSS) profile in a Long Term Evolution (LTE) network, or through some other mechanism. A user of the mobile communication device 102 may have the capability to toggle the single number service on and off according to his/her personal preference. In an embodiment, the user may invoke one of the Voice over Internet Protocol applications 108 to toggle the single number service on and off. Alternatively, the user may invoke something else such as a widget frame, a switch, a dialogue box, etc., to toggle the single number service on and off.

In an embodiment, a Voice over Internet Protocol call may be placed to a Voice over Internet Protocol identity linked to the Internet Protocol address of the electronic device 130 and may ring through to both the electronic device 130 and the mobile communication device 102. In response to answering the Voice over Internet Protocol call on one of the devices, the incoming call signal to the device on which the Voice over Internet Protocol call was not answered may be canceled and the Voice over Internet Protocol call may be established on the device which answered the call. An acknowledge receipt message may be sent in response to receiving the call, and the call may be routed to the receiving device based on the acknowledgement receipt message.

For example, when both devices are ringing to indicate an incoming Voice over Internet Protocol call dually routed to both devices, a user may answer the Voice over Internet Protocol call on the mobile communication device 102 and the incoming call signal to the electronic device 130 may be canceled and the Voice over Internet Protocol call established on the mobile communication device 102. In an embodiment, the Voice over Internet Protocol call may be converted from an Internet Protocol context to a context compatible with the mobile communication device 102. For example, the Voice over Internet Protocol call may be converted to an analog voice context. Alternatively, the mobile communication device 102 may be able to receive the Voice over Internet Protocol call in an Internet Protocol context.

In an embodiment, a user of the mobile communication device 102 may receive a call through the Public Switched Telephone Network (PSTN) while communicating on a call that originated as a Voice over Internet Protocol call that was dually routed to the mobile communication device 102 and to the electronic device 130. In this case, the user may swap between calls by leaving trust to receive the PSTN call and returning to trust to continue the call that originated as a Voice over Internet Protocol call. In some cases, the call that originated as a Voice over Internet Protocol call may not occur in trust, and switching between calls may not involve entering and leaving trust. In an embodiment, calls that occur through different networks may be billed to different entities.

In an embodiment, a user of the mobile communication device 102 may be affiliated with an enterprise and may conduct business through the Voice over Internet Protocol service. For example, the user of the mobile communication device 102 may participate in video conferences through Voice over Internet Protocol communications on the electronic device 130. It may be the case that service provider agreements have arranged for certain services, such as Voice over Internet Protocol communications, to be billed to the enterprise and other communications, such as PSTN calls, to be billed to the user.

Thus, it may be the case that swapping from a call that originated as a Voice over Internet Protocol call to a Voice over Internet Protocol identity linked to the Internet Protocol address of the electronic device 130 that was dually routed to both the electronic device 130 and to the mobile communication device 102 to a PSTN call directly routed to the mobile communication device 102 may be associated with a change in billing entities. In some cases, the trusted security zone 150 may be configured to keep track of Voice over Internet Protocol communications. Alternatively, trusted sources across the network 116 may keep track of Voice over Internet Protocol communications. For example, a call detail record can be generated and reported back to the mobile service provider Voice over Internet Protocol core/IMS 128 or the trusted Voice over Internet Protocol server 118.

In an embodiment, the call detail record may be established after receiving a call initiation request that was converted from Voice over Internet Protocol to the Public Switched Telephone Network and routed to the mobile communication device 102. The call detail record may comprise information about the length of the call, information about the calling party, information about the called party, and/or other information. The call may have been routed to the mobile communication device 102 based on a cross listing of the mobile communication device 102 in a routing table. In some cases, the call detail record may be generated, created and/or established by a telephone exchange. In an embodiment, the call detail record may be used for billing purposes. The billing may be based on the amount of time an application on the mobile communication device 102 was running. The application may be a Skype application, an ooVoo application, a Vonage application, a Google Talk application, or some other application. The call detail record may be generated, created, and/or established upon completion of the call.

Figure 1B:
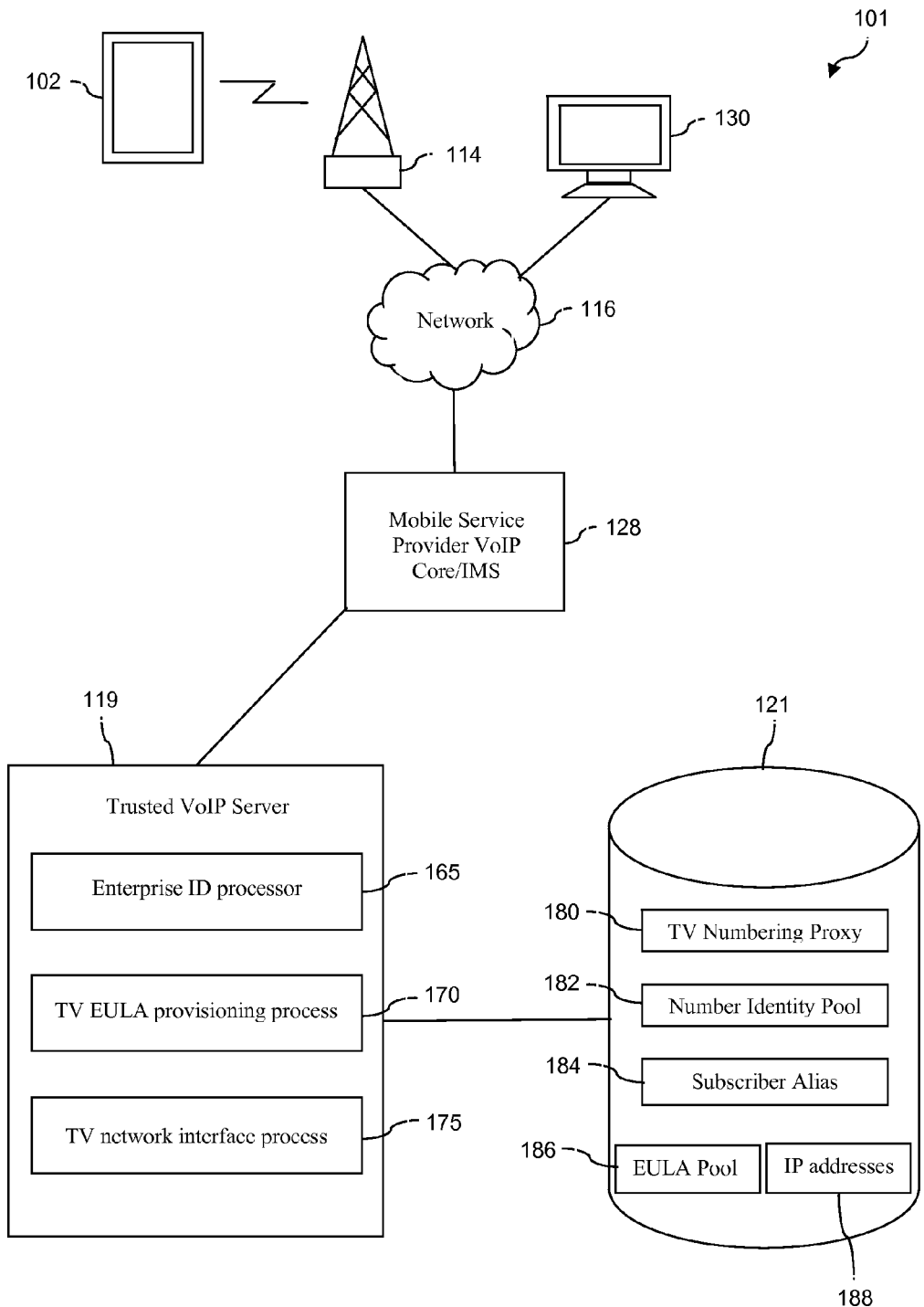
FIG. 1B is an illustration of a communication system according to an embodiment of the disclosure.

Turning now to FIG. 1B, a communication system 101 is described. In an embodiment, the communication system 101 may comprise the mobile communication device 102, the base transceiver station 114, the electronic device 130, the network 116, the Mobile Service Provider Voice over Internet Protocol Core/IMS 128, a trusted Voice over Internet Protocol server 119, and a trusted data store 121. The trusted Voice over Internet Protocol server 119 may comprise an enterprise identity (ID) processor 165, a Trusted Voice End User License Agreement (TV EULA) provisioning process 170, and a Trusted Voice (TV) network interface process 175. The trusted data store 121 may comprise a Trusted Voice (TV) numbering proxy 180, a number identity pool 182, a subscriber alias data store 184, an End User License Agreement (EULA) pool 186, and an Internet Protocol (IP) address data store 188.

In an embodiment, the Trusted Voice End User License Agreement provisioning process 170 may direct the enterprise identity processor 165 to assign the license key 106 and/or the identifier 104 to the mobile communication device 102. The Trusted Voice numbering proxy 180 may be dipped to mark the number identity pool 182 to indicate that the identifier 104 has been assigned to the mobile communication device 102. The End User License Agreement pool 186 may be marked to indicate that the license key 106 has been assigned to the mobile communication device 102. The Trusted Voice network interface process 175 may be invoked to insert the license key 106 and/or the identifier 104 into the mobile communication device 102.

In an embodiment, the Trusted Voice network interface process 175 may direct the trusted Voice over Internet Protocol server 119 to query the Mobile Service Provider Voice over Internet Protocol core/IMS 128 for session initiation protocol routing and the address of the mobile communication device 102. Trusted applications 110 on the mobile communication device 102 may be informed that the license key 106 and the identifier 104 are valid. The trusted applications 110 may be configured to authenticate the mobile communication device 102 to the Trusted Voice over Internet Protocol server 119 in response authentication requests.

In an embodiment, the subscriber alias data store 184 may comprise subscriber email addresses that may be linked to subscriber Internet Protocol addresses contained in the Internet Protocol address data store 188. In some cases, subscriber aliases may be Voice over Internet Protocol service identities. Information contained in the subscriber alias data store 184 and/or the Internet Protocol address data store 188 may be used in routing calls to the electronic device 130 and/or to other devices. In an embodiment, the number identity pool 182 may be used in routing calls to the mobile communication device 102 based on the identifier 104 marked as assigned to the mobile communication device 102 in the number identity pool 182. A routing table may be modified based on assigned identifiers in the number identity pool 182. In an embodiment, the routing table may be modified to cross list the identifier 104 with a subscriber alias or an Internet Protocol address of the electronic device 130.

Figure 2:
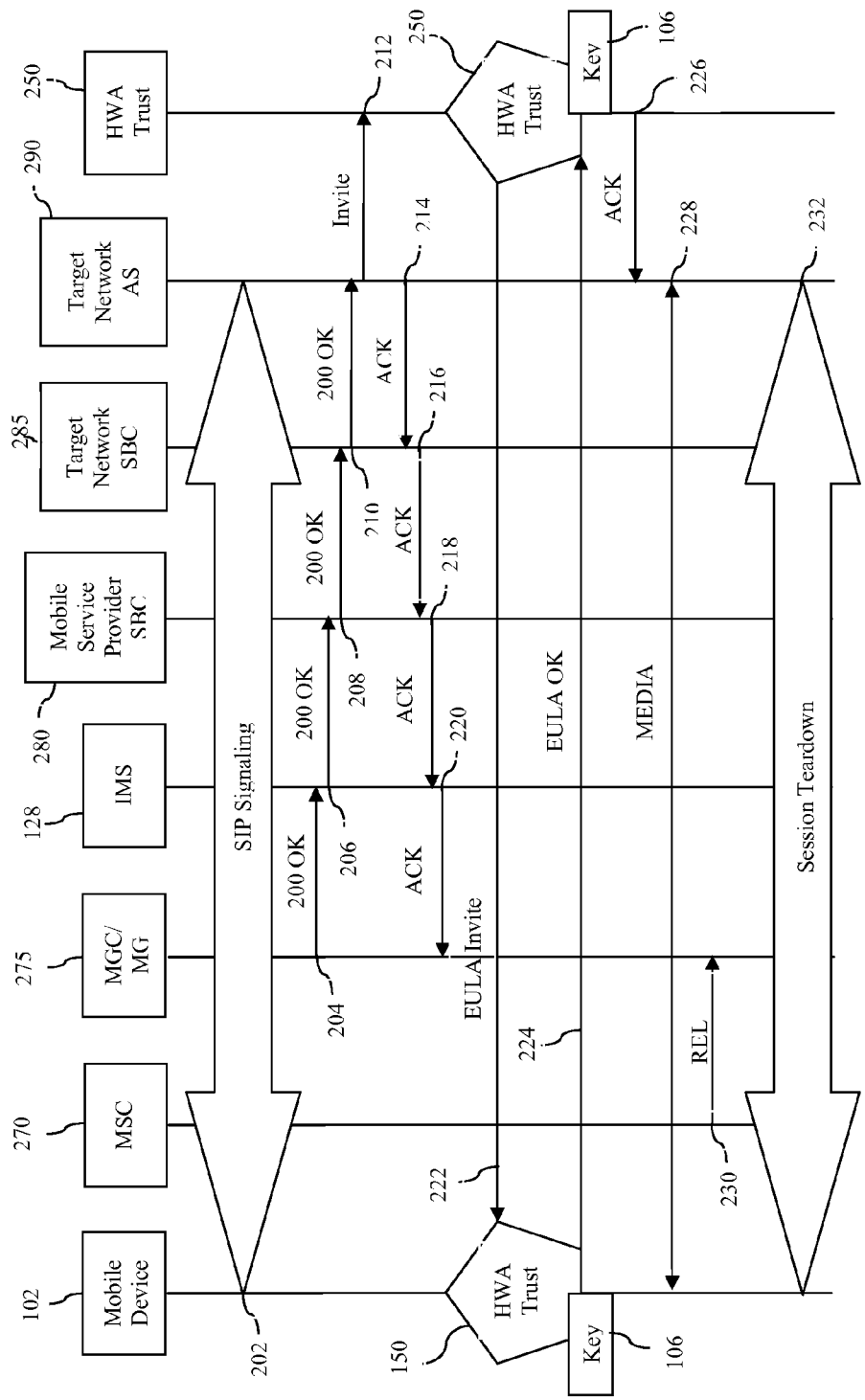
FIG. 2 is a message sequence diagram according to an embodiment of the disclosure.

Turning now to FIG. 2, a message sequence 200 is described. In an embodiment, the message sequence 200 may be performed when the mobile communication device 102 authenticates to a Voice over Internet Protocol service as described in reference to FIG. 1A. For example, as described in reference to FIG. 1A, the mobile communication device 102 may authenticate to a Voice over Internet Protocol service in response to a connection request initiated by the electronic device 130, by the mobile communication device 102, or by another device. The connection request may be routed to the mobile communication device 102 based on a cross listing of the identifier 104 in a routing table.

The mobile communication device 102 exchanges Session Initiation Protocol (SIP) signaling 202 with a target network application server (AS) 290. It is understood that the Session Initiation Protocol signaling 202 may entail one or more messages sent both to and from each of the mobile communication device 102, a Mobile Switching Center (MSC) 270, a Media Gateway Controller/Media Gateway (MGC/MG) 275, the mobile service provider Voice over Internet Protocol core/IMS 128, a mobile service provider Session Border Controller (SBC) 280, a target network Session Border Controller 285, and the target network application server 290.

During the Session Initiation Protocol signaling 202, the Media Gateway Controller/Media Gateway 275 sends a 200 OK message 204 to the mobile service provider Voice over Internet Protocol core/IMS 128 indicating that the initial requests associated with the Session Initiation Protocol signaling 202 have completed successfully. The mobile service provider Voice over Internet Protocol core/IMS 128 relays a 200 OK message 206 to the mobile service provider Session Border Controller 280. The mobile service provider Session Border Controller 280 relays a 200 OK message 208 to the target network Session Border Controller 285. The target network Session Border Controller 285 relays a 200 OK message 210 to the target network application server 290.

In response to receiving the 200 OK message 210, the target network application server 290 sends an invite 212 to a trusted security zone area of hardware assisted trust (HWA trust) 250. The target network application server 290 may send an acknowledgement message (ACK) 214 to the target network Session Border Controller 285. The target network Session Border Controller 285 sends an acknowledgement message 216 to the mobile service provider Session Border Controller 280. The mobile service provider Session Border Controller 280 sends an acknowledgement message 218 to the mobile service provider Voice over Internet Protocol core/IMS 128. The mobile service provider Voice over Internet Protocol core/IMS 128 sends an acknowledgement message 220 to the Media Gateway Controller/Media Gateway 275.

In response to receiving the invite 212, the trusted security zone area of hardware assisted trust 250 sends an End User License Agreement (EULA) invite 222 to the trusted security zone 150 of the mobile communication device 102. The trusted security zone 150 of the mobile communication device 102 sends an End User License Agreement (EULA) OK message 224 to the trusted security zone area of hardware assisted trust 250. In an embodiment, the trusted security zone 150 may establish a trusted execution environment on the mobile communication device 102 through which it may send the End User License Agreement OK message 224 which may authenticate the mobile communication device 102 to the trusted security zone area of hardware assisted trust 250. The End User License Agreement OK message 224 may comprise information about the license key 106 and may authenticate the mobile communication device 102 based on the license key 106. Both the trusted security zone 150 of the mobile communication device 102 and the trusted security zone area of hardware assisted trust 250 may comprise copies of the license key 106.

In response to receiving the End User License Agreement OK message 224, the trusted security zone area of hardware assisted trust 150 sends an acknowledgement message 226 to the target network application server 290. Media 228 may be exchanged between the target network application server 290 and the mobile communication device 102 in response to the target network application server 290 successfully receiving the acknowledgement message 226. It is understood that the media 228 may entail one or more messages sent both to and from each of the mobile communication device 102, the Mobile Switching Center (MSC) 270, the Media Gateway Controller/Media Gateway (MGC/MG) 275, the mobile service provider Voice over Internet Protocol core/IMS 128, the mobile service provider Session Border Controller (SBC) 280, the target network Session Border Controller 285, and the target network application server 290. In an embodiment, media 228 may comprise images, voice communications, and/or other things. In some embodiments, the media 228 may be exchanged under an umbrella of trust. In other embodiments, the media 228 may be exchanged outside of the realm of trust.

The Mobile Switching Center 270 sends a release message (REL) 230 to the Media Gateway Controller/Media Gateway 275. In an embodiment, the release message 230 may be sent in response to the conclusion of transfer of media 228. Session teardown messages 232 are sent between the mobile communication device 102 and the target network application server 290 in response to the release message 230. It is understood that session teardown messages 232 may entail one or more messages sent both to and from each of the mobile communication device 102, the Mobile Switching Center (MSC) 270, the Media Gateway Controller/Media Gateway (MGC/MG) 275, the mobile service provider Voice over Internet Protocol core/IMS 128, the mobile service provider Session Border Controller (SBC) 280, the target network Session Border Controller 285, and the target network application server 290.

Figure 3:
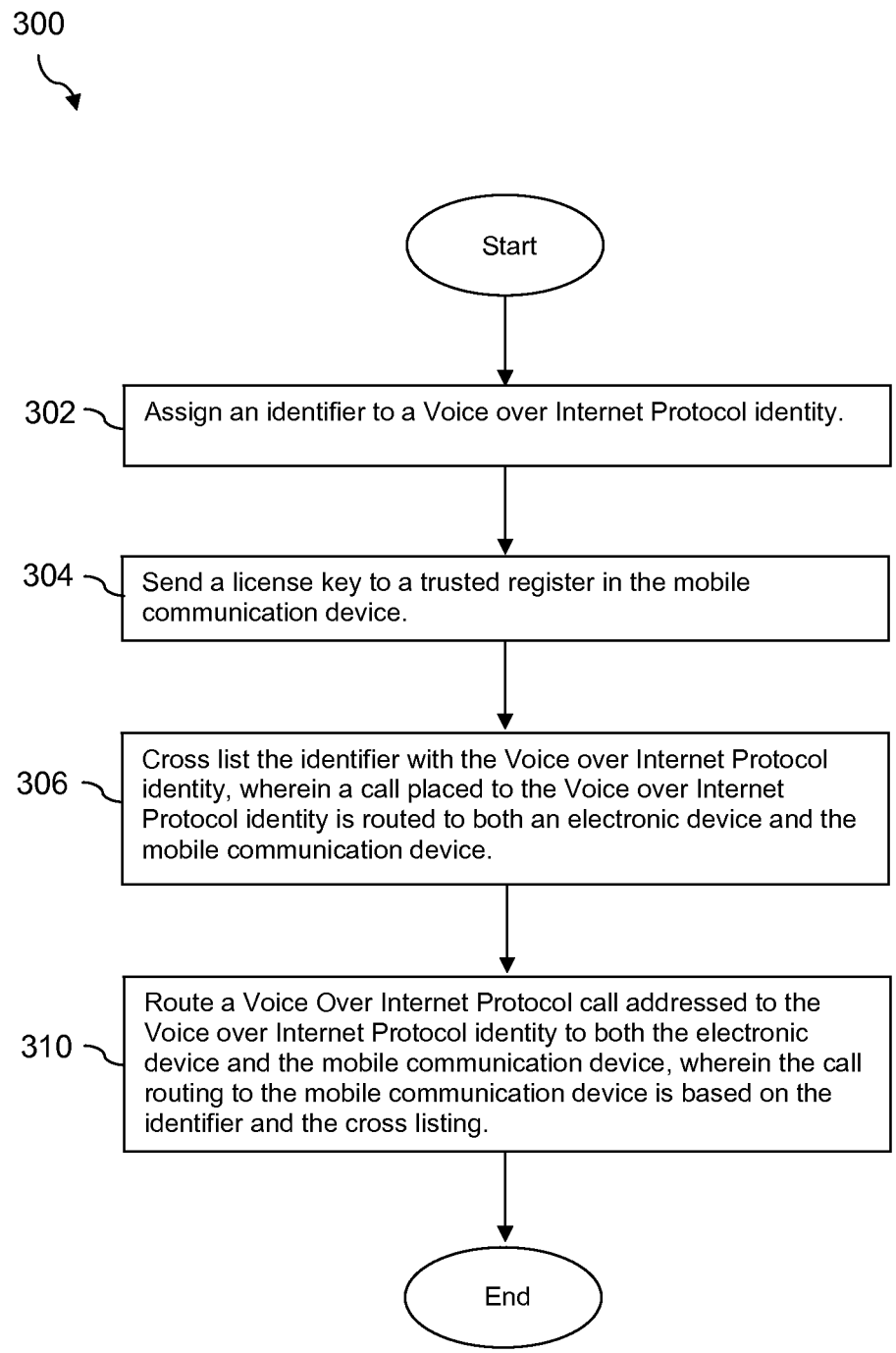
FIG. 3 is a flowchart of a method according to an embodiment of the disclosure.

Turning now to FIG. 3, a method 300 is described. In an embodiment, the method 300 may be performed by one or more components of the communication system 100 discussed with reference to FIG. 1A. At block 302, an identifier may be assigned to a Voice over Internet Protocol identity. The identifier may be configured to associate a mobile communication device separate from an electronic device with the Voice over Internet Protocol identity of the electronic device. For example, the identifier may allow a mobile phone and a computer to be associated and/or linked. In some cases, the mobile communication device and the electronic device may be associated and/or linked to a single identity or a common identity recognizable by a Voice over Internet Protocol service. In an embodiment, the identifier may be kept in trust to prevent the identifier from being spoofed. Keeping the identifier in trust may keep characteristics of the identifier unknown to users, mobile service providers, and Voice over Internet Protocol service providers.

At block 304, a license key may be sent to a trusted register in the mobile communication device. In some cases, the identifier may also be sent to the mobile communication device. In an embodiment, the trusted register may comprise a trusted port controlled by the trusted security zone of the mobile communication device. The identifier may be cross listed at block 306 such that a call placed to the Voice over Internet Protocol identity may be routed to both an electronic device and to the mobile communication device. In an embodiment, cross listing the mobile communication device and the electronic device may comprise altering a routing table. In a circuit switched network, the routing table may be altered by setting and/or modifying a Wireless Intelligent Network trigger. In a Long Term Evolution network, the routing table may be altered by modifying a Home Subscriber Service profile of a user of the mobile communication device and electronic device.

At block 310, a Voice over Internet Protocol call addressed to the Voice over Internet Protocol identity may be routed to both the electronic device and to the mobile communication device. In an embodiment, the call may be routed to both the electronic device and to the mobile communication device by configuring the calls to be forked at a gateway, such as a media gateway, based on the cross listing of the identifier. In an embodiment, the Voice over Internet Protocol identity may be a Skype identity, an ooVoo identity, a Vonage identity, a Google Talk identity, or some other Voice over Internet Protocol identity. In some cases, the Voice over Internet Protocol identity may be an identity associated with a user of an electronic device.

Figure 4:
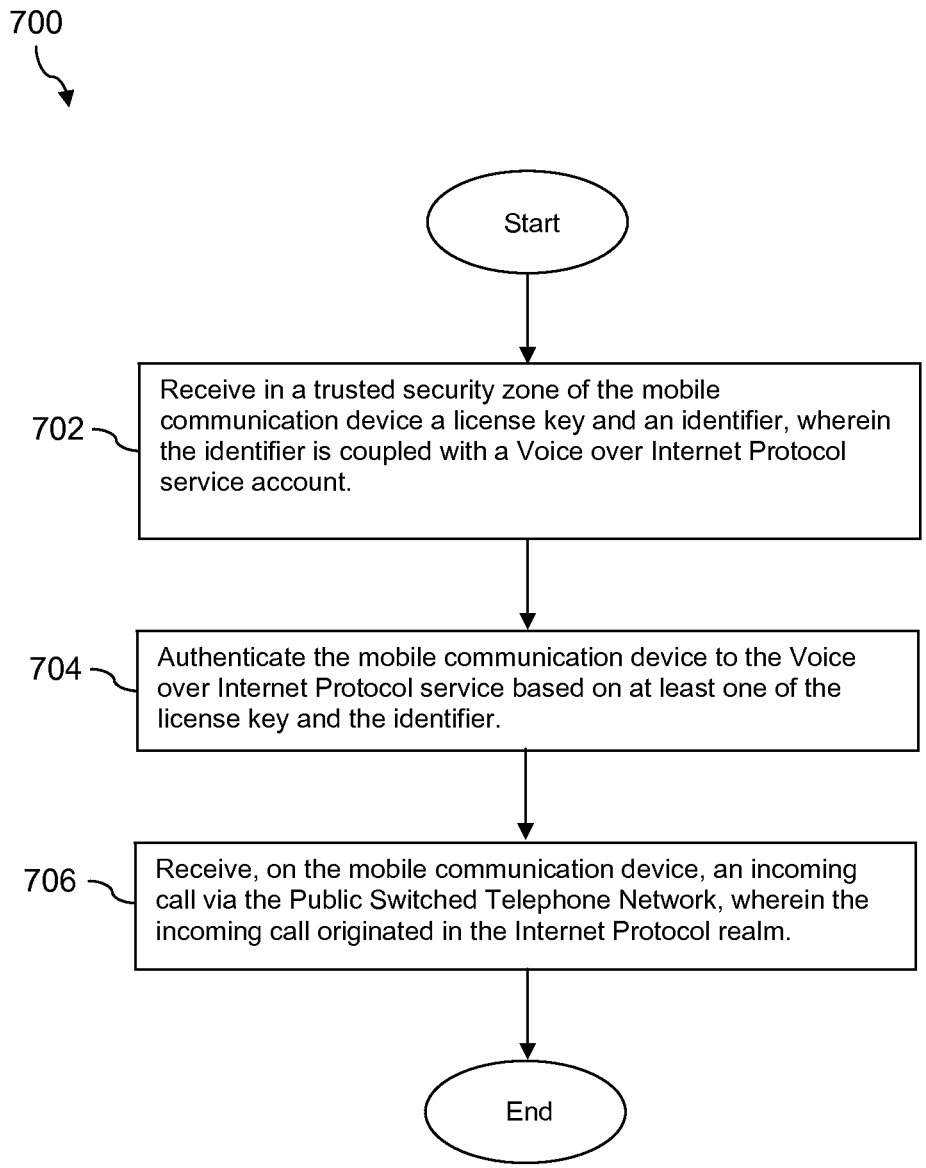
FIG. 4 is a flowchart of a method according to an embodiment of the disclosure.

Turning now to FIG. 4, a method 700 is described. In an embodiment, the method 700 may be implemented by one or more elements of the communication system 100 described with reference to FIG. 1A. At block 702, a license key and an identifier may be received in a trusted security zone of a mobile communication device. The identifier may be coupled with a Voice over Internet Protocol service account. In an embodiment, the Voice over Internet Protocol service account may be an account of an electronic device. In some cases, the mobile communication device may be a mobile phone, cell phone, smart phone, or feature phone, or some other handset, and the electronic device may be a desktop computer or laptop computer. In an embodiment, a Voice over Internet Protocol identity, such as a number or address, may be assigned to the electronic device based on the electronic device's Voice over Internet Protocol service account.

At block 704, the mobile communication device may be authenticated to the Voice over Internet Protocol service based on at least one of the license key and the identifier. The mobile communication device and the electronic device may be cross listed in a network routing table. An incoming call signal may be received on the mobile communication device at block 706. In an embodiment, the call may have originated in the Internet Protocol realm and may be received on the mobile communication device via the Public Switched Telephone Network. The incoming call may be routed to both the mobile communication device and the electronic device (e.g., forked) using the network routing table based on a single connection request. In an embodiment, the mobile communication device may be configured to ring, vibrate, light up, play audio, make other sounds, and/or otherwise indicate receiving the incoming call signal. The electronic device may also be configured to ring, vibrate, light up, play audio, make other sounds, and/or otherwise indicate receiving an incoming call. Thus, calls routed to both the electronic device and the mobile communication device may elicit both devices to indicate an incoming call.

Figure 5:
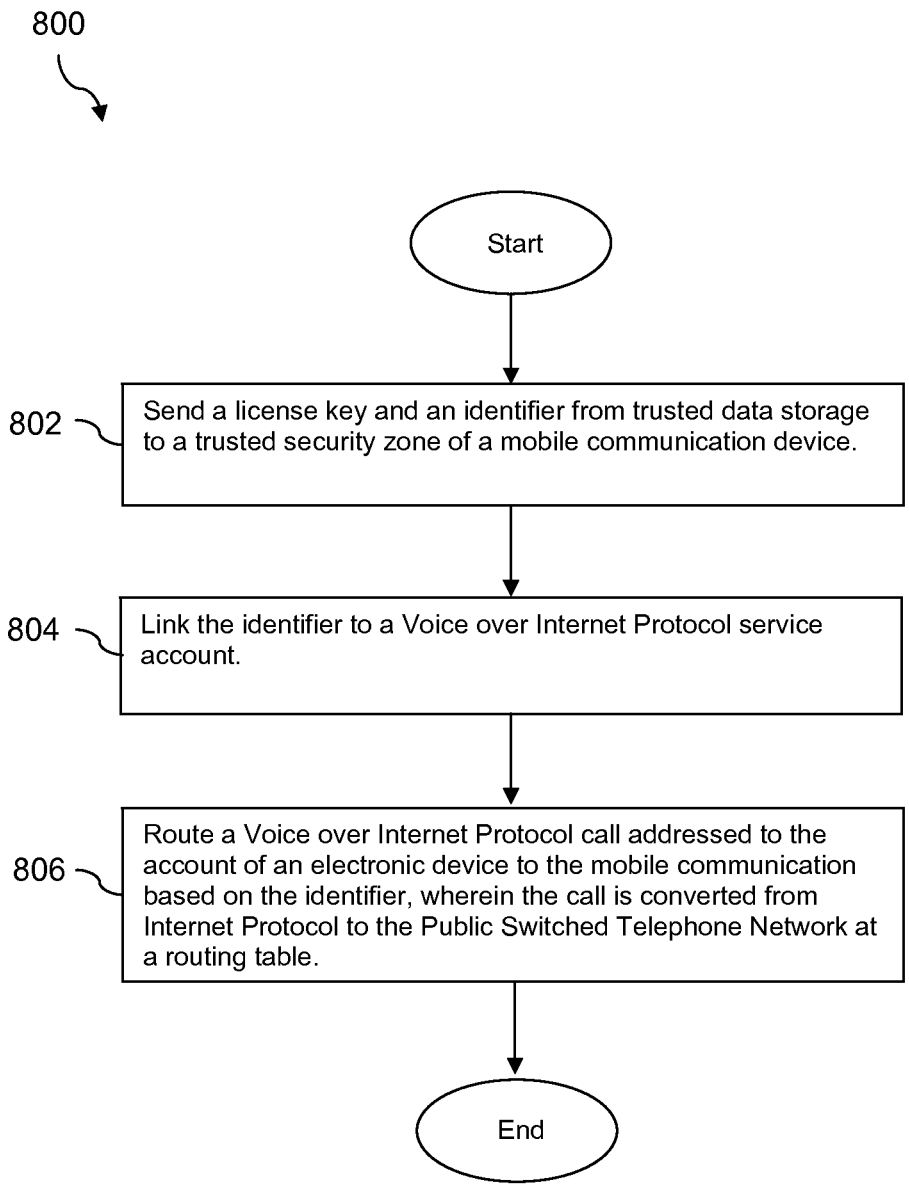
FIG. 5 is a flowchart of a method according to an embodiment of the disclosure.

Turning now to FIG. 5, a method 800 is described. In an embodiment, the method 800 may be implemented by one or more elements of the communication system 100 described in FIG. 1A. At block 802, a license key and an identifier may be sent from trusted data storage to a trusted security zone of a mobile communication device. In some cases, only the license key may be sent. The identifier may be linked, at block 804, to a Voice over Internet Protocol service account. In an embodiment, linking the identifier to a Voice over Internet Protocol service account may comprise cross listing the identifier with the Voice over Internet Protocol service account in a directory of a routing network.

At block 806, a Voice over Internet Protocol call addressed to the account of an electronic device may be routed to the mobile communication device based on the identifier. In an embodiment, the call may be converted from Internet Protocol to the Public Switched Telephone Network, wherein the conversion may occur at a routing table. In an embodiment the call may be routed to both the electronic device and the mobile communication device such that the mobile communication device and the electronic device dually receive an incoming call signal. In an embodiment, dually receiving an incoming call signal may comprise both the electronic device and the mobile communication device receiving the incoming call signal at the same time, within about one half second of each other, within about one second of each other, within about two seconds of each other, within about three seconds of each other, within about four seconds of each other, within about five seconds of each other, or within some other time period of each other. Additionally, the mobile communication device and the electronic device may be configured to ring or otherwise indicate receipt of the incoming call signal as discussed hereinabove.

Figure 6:
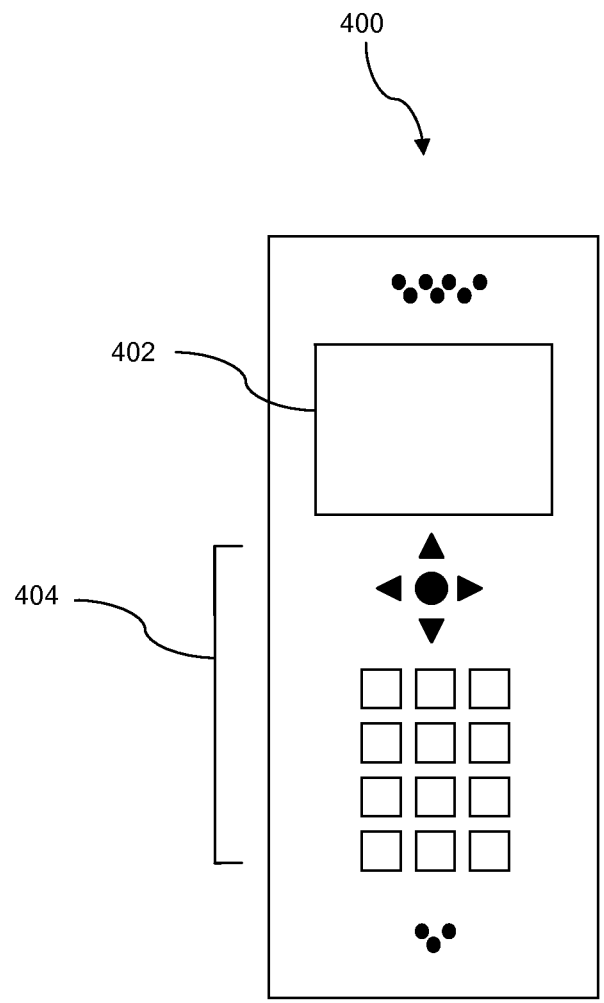
FIG. 6 is an illustration of a mobile communication device according to an embodiment of the disclosure.

FIG. 6 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 7:
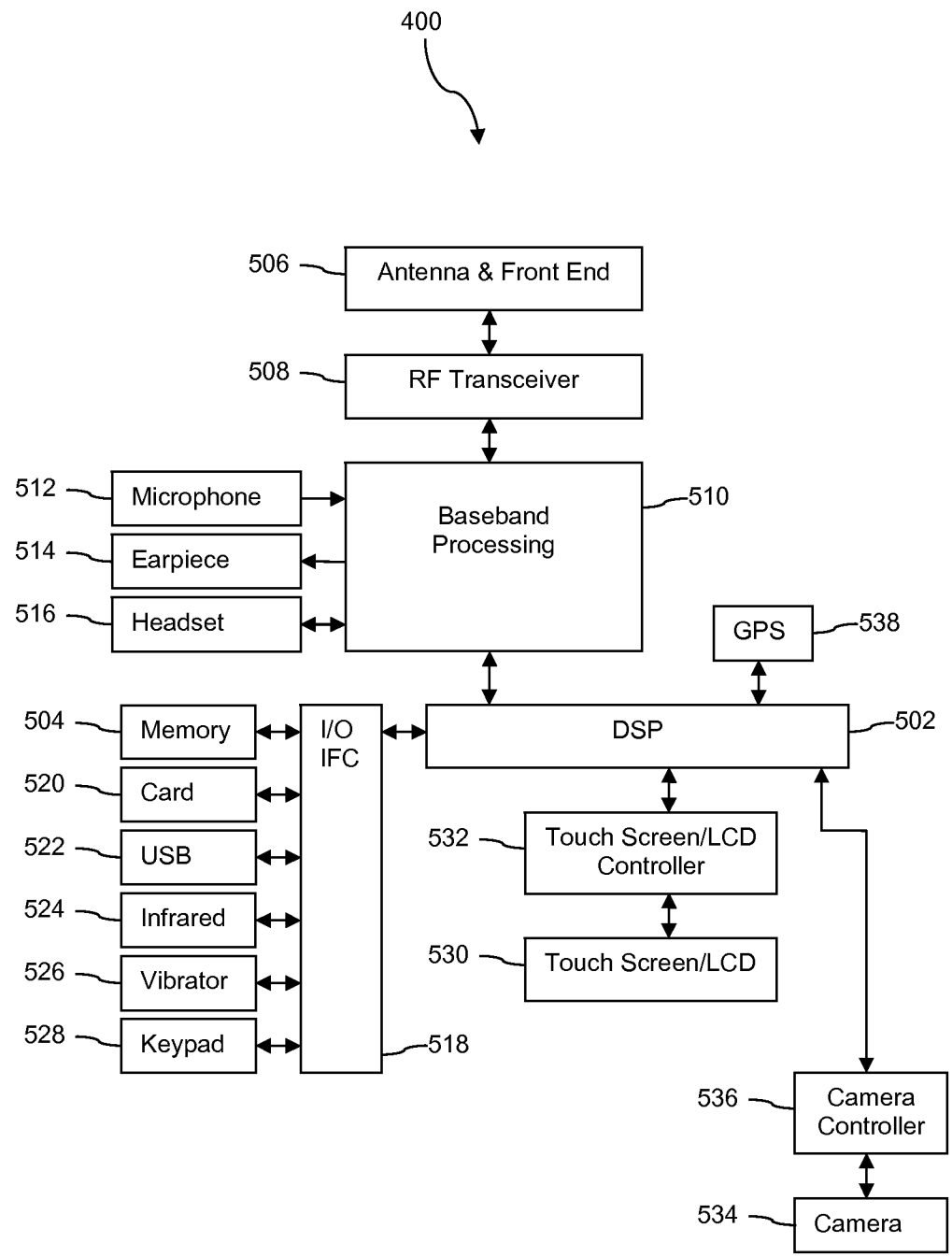
FIG. 7 is a block diagram of a mobile communication device according to an embodiment of the disclosure.

FIG. 7 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 8A:
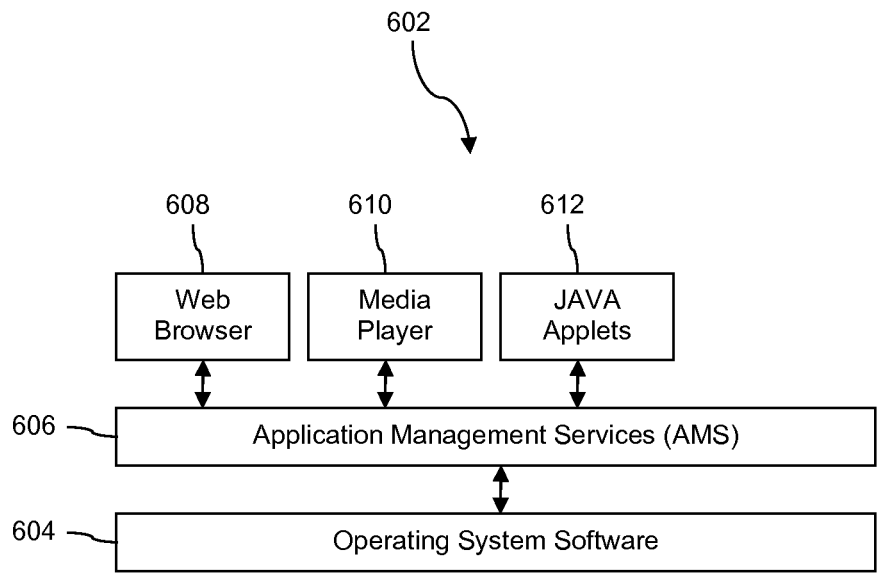
FIG. 8A is a block diagram of a software architecture of a mobile communication device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 8A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 8B:
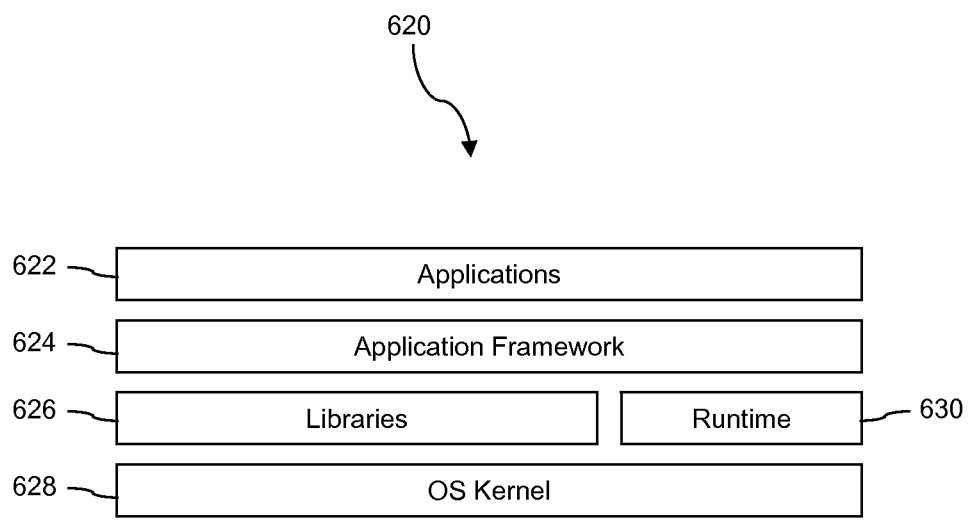
FIG. 8B is a block diagram of another software architecture according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
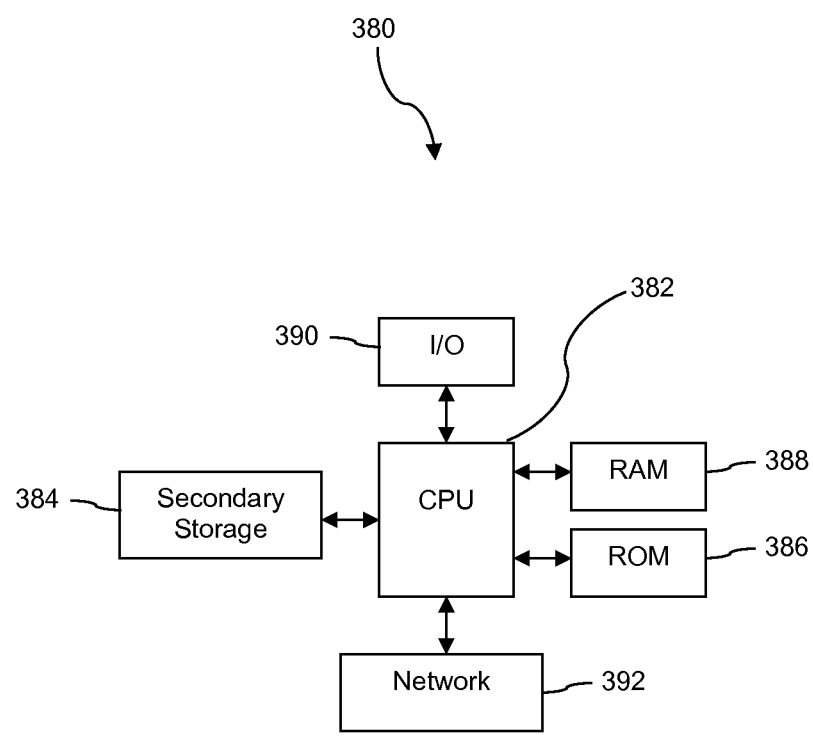
FIG. 9 illustrates an exemplary computer system suitable for implementing the several embodiments of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

A method of establishing a call detail record may comprise receiving a call initiation request from an electronic device, converting the call from Voice over Internet Protocol to the Public Switched Telephone Network, routing the call to a mobile communication device, and establishing a call detail record for the call. The call may be routed to the mobile communication device based on a cross listing of the mobile communication device in a routing table. The call detail record may be generated, created and/or established by a telephone exchange. In an embodiment, the call detail record may be used for billing purposes. The billing may be based on the amount of time an application on the mobile communication device was running. The application may be a Skype application, an ooVoo application, a Vonage application, a Google Talk application, or some other application. The call detail record may be generated, created, and/or established upon completion of the call.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of extending a peer-to-peer platform to a mobile communication device, comprising:
assigning an identifier to a Voice over Internet Protocol identity of a Voice over Internet Protocol service;
sending a license key and the identifier from trusted data storage to a trusted register in the mobile communication device;
marking the trusted data storage to indicate that the license key and the identifier have been distributed;
authenticating, based on at least one of the license key or the identifier, the mobile communication device to the Voice over Internet Protocol Service;
associating the mobile device with an electronic device in response to the authenticating;
cross listing, based on the associating, the identifier with the Voice over Internet Protocol identity, wherein a call placed to the Voice over Internet Protocol identity is routed to both the electronic device and the mobile communication device; and
routing, based on the cross listing, a Voice Over Internet Protocol call addressed to the Voice over Internet Protocol identity to both the electronic device and the mobile communication device at substantially the same time, wherein the call routing to the mobile communication device is based on the identifier and the cross listing.

2. The method of claim 1, wherein the trusted register is a port of the mobile communication device controlled by a trusted security zone of the mobile communication device.

3. The method of claim 1, wherein routing the Voice over Internet Protocol call to both the electronic device and the mobile communication device comprises forking the call at a gateway.

4. The method of claim 1, wherein the routing is accomplished in a circuit switched network by one of setting or modifying a wireless intelligent network trigger.

5. The method of claim 1, wherein the routing is accomplished in a LTE network by modifying a user's Home Subscriber Server profile.

6. The method of claim 1, wherein the identifier is configured to associate a mobile communication device separate from the electronic device with the Voice over Internet Protocol identity.

7. The method of claim 1, wherein routing the Voice over Internet Protocol call comprises routing the Voice over Internet Protocol call to the mobile communication device over a Public Switched Telephone Network using the identifier.

8. The method of claim 1, wherein the identifier is a telephone number.

9. A method of establishing a peer-to-peer platform on a mobile communication device, comprising:
receiving, in a trusted security zone of the mobile communication device, a license key and an identifier from a trusted data storage, wherein the identifier is associated with a Voice over Internet Protocol service account, and wherein the trusted data storage is marked to indicate that the license key and the identifier have been distributed;
sending at least one of the license key or the identifier to a Voice over Internet Protocol service providing the Voice over Internet Protocol service account;
authenticating, based on at least one of the license key or the identifier, the mobile communication device to the Voice over Internet Protocol service; and
receiving, on the mobile communication device, based on the authentication, an incoming call via the Public Switched Telephone Network, wherein the incoming call originated in the Internet Protocol realm.

10. The method of claim 9, wherein the incoming call is routed to both the mobile communication device and to an electronic device in response to a single connection request.

11. The method of claim 9, wherein the license key is revocable.

12. The method of claim 9, wherein the identifier is hidden in the trusted security zone such that characteristics of the identifier are unknown to a user of the mobile communication device, are unknown to a Public Switched Telephone Network service provider, and are unknown to a Voice over Internet Protocol service provider.

13. A method of extending a peer-to-peer platform to a mobile communication device, comprising:
sending a license key and an identifier from trusted data storage to a trusted security zone of a mobile communication device, wherein the identifier is stored in the trusted security zone, wherein characteristics of the identifier are unknown to a user of the mobile communication device, a Public Switched Telephone Network service provider, and to a Voice over Internet Protocol service provider;
marking the trusted data storage to indicate that the license key and the identifier have been distributed;
authenticating, based on the identifier, the mobile communication device with a Voice over Internet Protocol service provided by the Voice over Internet Protocol service provider;
associating, in response to the authenticating, the identifier to a Voice over Internet Protocol service account of an electronic device; and
dually routing, based on the association, a Voice over Internet Protocol call addressed to the Voice over Internet Protocol service account of the electronic device to the mobile communication device and the electronic device, wherein the call is converted from Internet Protocol to the Public Switched Telephone Network at a routing table.

14. The method of claim 13, wherein the call is dually routed to the electronic device and the mobile communication device at substantially the same time.

15. The method of claim 14, wherein the mobile communication device and the electronic device receive the call within two seconds of each other.

16. The method of claim 14, wherein routing the call to both the electronic device and the mobile communication device comprises forking the calls based on a cross listing of the identifier.

17. The method of claim 13, wherein the identifier is a mobile ID.

18. The method of claim 13, wherein associating the identifier to the Voice over Internet Protocol service account comprises creating a cross listing of the identifier.

19. The method of claim 13, wherein the Voice over Internet Protocol service account is one of a Skype account, an ooVoo account, a Vonage account, or a Google Talk account.

* * * * *